United States Patent [19]

Nakasone

[11] Patent Number: 4,728,110
[45] Date of Patent: Mar. 1, 1988

[54] LAMINATE TYPE MANIFOLD GASKET

[75] Inventor: Hidetaka Nakasone, Omiya, Japan

[73] Assignee: Ishikawa Gasket Co., Ltd., Tokyo, Japan

[21] Appl. No.: 835,905

[22] Filed: Mar. 4, 1986

[30] Foreign Application Priority Data

Jan. 13, 1986 [JP] Japan .................. 61-00287[U]

[51] Int. Cl.$^4$ ............................................. F16J 15/08
[52] U.S. Cl. ................................ 277/213; 277/234; 277/235 B
[58] Field of Search .............. 277/213, 235 B, 234, 277/233, 235 R

[56] References Cited

U.S. PATENT DOCUMENTS

| 1,812,578 | 6/1931 | Bailey | 277/213 X |
| 1,851,948 | 3/1932 | Summers | 277/235 B X |
| 2,114,442 | 4/1938 | Fitzgerald | 277/235 B X |
| 3,806,138 | 4/1974 | Herrington | 277/234 X |
| 4,196,913 | 4/1980 | Oka | 277/235 B |
| 4,290,616 | 9/1981 | Nicholson | 277/213 X |
| 4,387,904 | 6/1983 | Nicholson | 277/235 B |

FOREIGN PATENT DOCUMENTS

| 1367422 | 6/1964 | France | 277/235 B |
| 2121123 | 12/1983 | United Kingdom | 277/235 B |

Primary Examiner—Allan N. Shoap
Attorney, Agent, or Firm—Frank J. Jordan; C. Bruce Hamburg; Manabu Kanesaka

[57] ABSTRACT

A manifold gasket for an internal combustion engine to be situated between a manifold and a cylinder head comprises a first outer plate abutting against the manifold, a second outer plate abutting against the cylinder head, and at least two inner plates situated between the first and second outer plates. Each inner plate is provided with a bead to surround an exhaust hole for an exhaust fluid passage of the engine. The bead extends substantially perpendicularly to the horizontal plane of the inner plate and includes a top portion. The first and second outer plates and inner plates are arranged and connected together so that the first and second outer plates slide relative to the inner plates respectively and the beads of the two inner plates absorb pressure applied perpendicular to the inner plates and seal between the manifold and the cylinder head.

9 Claims, 13 Drawing Figures

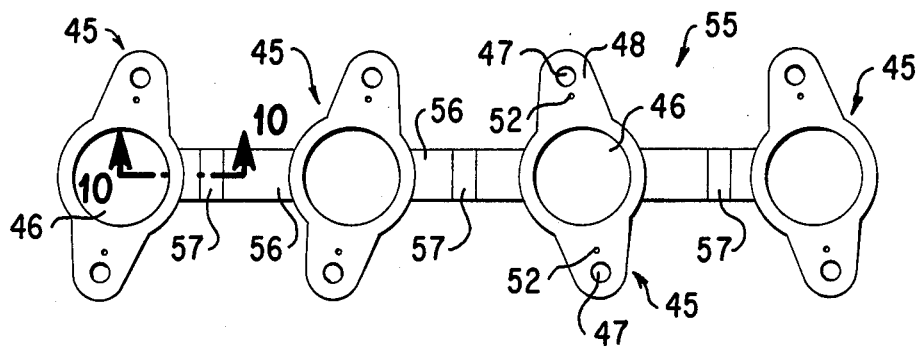
FIG. 9
FIG. 10
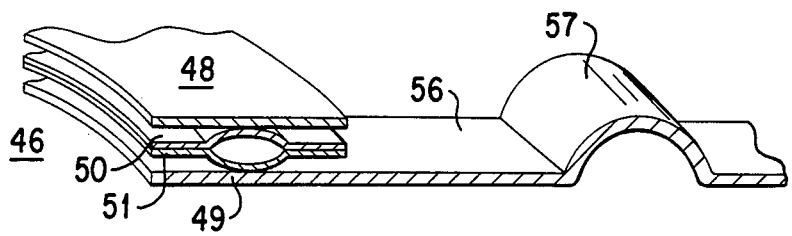
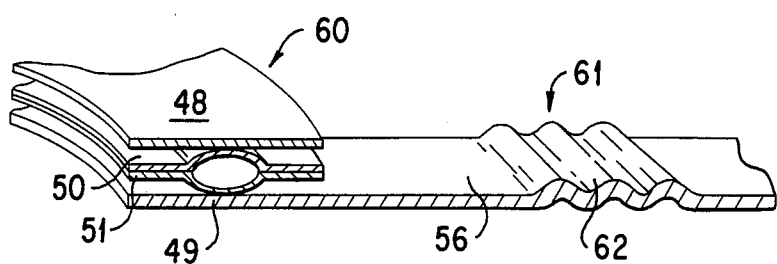
FIG. 11

LAMINATE TYPE MANIFOLD GASKET

FIELD OF THE INVENTION AND RELATED ART STATEMENT

The present invention relates to a manifold gasket for an internal combustion engine, which is immovably situated between a cylinder head and a manifold by means of bolts attached to the cylinder head passing through the manifold and the manifold gasket to thereby prevent an exhaust gas from leaking between the cylinder head and the manifold.

An automobile engine has been developed to become light in weight and small in size as well as to increase power. In order to satisfy these demands, an aluminum alloy is employed as a cylinder head, and the manifold is made thinner than before. Since the cylinder head is made of an aluminum alloy, the cylinder head expands due to high temperature when the engine is operated and contracts when the engine is stopped to thereby become cool in temperature. Further, since the manifold is made thin, a manifold flange slightly deforms by high temperature when the engine is operated. Also, the manifold gasket is cyclically exposed to high and low temperature according to operation and non-operation of the engine.

Due to the reasons as mentioned above, i.e., the cylinder head cyclically expands and contracts, the manifold slightly deforms when the engine is operated and the manifold gasket is cyclically exposed to high and low temperature, a conventional manifold gasket receives a stress to thereby be damaged or to be unable to provide proper seal because of insufficient seal pressure applied to the manifold gasket to cause problems, such as leakage of an exhaust gas.

Various types of gaskets have been proposed and used. One type of gasket is basically made of an asbestos and known as an asbestos gasket. This asbestos gasket, however, can not be used as a manifold gasket for a light weight and high power engine, because the recent engine exerts special stress to the manifold gasket as explained before. The manifold gasket made of an asbestos can not seal properly.

Another type of gasket is made of a metal and known as a metal gasket. A steel laminate gasket, one of metal gaskets, when compared with other metal gaskets, has good flexibility and heat resistance. Further, the steel laminate gasket with a bead therein possesses sufficient compression ability, when being tightened, to thereby provide good sealing ability by counteraction of the bead. Also, the sealing ability does not change as time goes by. The steel laminate gaskets are generally used for cylinder head gaskets of diesel engines, as shown in FIGS. 1-3.

The steel laminate gasket 10 is situated between a cylinder head and an engine body and includes at least one hole 11, through which a piston reciprocates. The gasket 10 as shown in FIG. 1 is provided with outer plates 12, 13, and two inner plates 14, 15 having bead portions 14a, 15a to surround the hole 11. Partition plates 16, 17 are respectively situated between the outer plate 12 and the inner plate 14, and between the outer plate 13 and the inner plate 15, while the partition plate 18 is situated between the two inner plates 14, 15.

The outer plate 12 is curved at a curved portion 19 adjacent the hole 11 and turned to be situated over the periphery of the outer plate 13 at a flange 20 thereof. When the gasket 10 is situated and tightened between the cylinder head and the engine body, the curved portion 19 seals around the hole 11 and, the bead portions 14a, 15a springly support the flange 20 and the outer plate 12.

A steel laminate gasket 21, as shown in FIG. 2, is provided with outer plates 22, 23, and an inner plate 24 having a bead portion 24a to surround the hole 11. A partition plate 25 is situated between the outer plate 22 and the inner plate 24, while a partition plate 26 is situated between the outer plate 23 and the inner plate 24. The outer plate 22 is curved at a curved portion 27 adjacent the hole 11 and is turned to be situated over the periphery of the outer plate 23 to form a flange 28. When the gasket 21 is situated and tightened between the cylinder head and the engine body, the curved portion 27 seals around the hole 11, and the bead portion 24a springly supports the flange 28 and the outer plate 22.

A steel laminate gasket 30, shown in FIG. 3, is provided with two outer plates 31, 32, and an inner plate 33 having a bead portion 33a. Plates 34, 35, 36 are arranged between the outer plates 31, 32 as shown in FIG. 3. The gasket 30 is further provided with a ring 37 having flanges 38, 39 and a curved portion 40. The flanges 38, 39 are situated ouside the outer plates 31, 32, and the curved portion 40 is located adjacent to the hole 11. When the gasket 30 is situated and tightened between the cylinder head and the engine body, the curved portion 40 seals around the hole 11, and the bead portion 33a springly supports the flanges 38, 39 of the ring 37.

The steel laminate gaskets having the structure as explained above can be properly used as cylinder head gaskets. However, the steel laminate gaskets as shown in FIGS. 1-3 can not be used as manifold gaskets in a light weight and high power engine developed recently.

For example, if the steel laminate gasket 21 as shown in FIG. 2 is used as a manifold gasket in a high power engine, the cylinder head H and the manifold M expand and contract as shown at arrows in FIG. 4 due to heat of the engine in compliance with operation or non-operation of the engine. Further, since the flange 28 and the outer plate 22 are securely connected to the manifold M and the cylinder head H respectively, when the cylinder head H and the manifold M expand and contract, the curved portion 27, which is a sealing portion of the gasket 21, is exposed to high stress to thereby develop fatigue to the curved portion 27. Consequently, a crack may occur in the curved portion 27. Further, when the flange 28 and the outer plate 22 are moved together with the cylinder head H and the manifold M, the curved portion 27 or the outer plate 23 is deformed (FIGS. 4A and 4B), so that such portions are finally broken.

The reason that the steel laminate gasket which can be properly used as a cylinder head gasket can not be used as a manifold gasket is that the cylinder head gasket can be tightened stronger than the power exerted on the manifold gasket. Further, since the rigidity of the gasket attaching portions of the cylinder head gasket is made stronger than that of the manifold gasket, the gasket attaching portions do not significantly deform. On the contrary, the gasket attaching portion for the manifold gasket in the recent engine is made thin for making the engine light in weight and small in size. Accordingly, the gasket attaching portion for the manifold gasket can not be strongly tightened and slightly deforms by heat of the engine. Namely, the cylinder head gasket is located in a better place for sealing than the manifold gasket. The manifold gasket in the recent engine must have specific characteristics adapted to be used in a bad sealing condition. The manifold gasket can not be substituted by any other gasket.

Accordingly, one object of the present invention is to provide a manifold gasket having a sufficient sealing ability in a severe condition in use caused by a light weight and small size engine developed recently.

Another object of the present invention is to provide a manifold gasket as stated above, wherein the manifold gasket can be sufficiently sealed by a relatively small amount of pressure applied thereto.

A further object of the present invention is to provide a manifold gasket as stated above, wherein the manifold gasket can properly absorb change of sealing pressure applied thereto, which is caused by deformation of the gasket attaching portion due to heat as well as a poor rigidity of the gasket attaching portion.

A still further object of the present invention is to provide a manifold gasket as stated above, wherein the manifold gasket can properly respond and operates to high and low temperature due to operation and non-operation of an engine.

A still further object of the present invention is to provide a manifold gasket as stated above, wherein the structure is simple and the gasket can be economically manufactured.

Further objects and advantages of the present invention will be apparent from the following description of the invention.

SUMMARY OF THE INVENTION

A manifold gasket in accordance with the present invention is adapted to be situated between a manifold and a cylinder head of an internal combustion engine. The manifold gasket comprises a first outer plate abutting against the manifold, a second outer plate abutting against the cylinder head, and at least two inner plates situated between the first and second outer plates. Each inner plate is provided with a hole corresponding to an exhaust hole of the engine and a bead adjacent the hole to surround the same. The bead extends substantially perpendicularly to the horizontal plane of the inner plate and includes a top portion. The first and second outer plates and inner plates are arranged and connected together so that the first and second outer plates can slide relative to the inner plates respectively and the beads of the two inner plates absorb pressure applied perpendicular to the inner plates and seal between the manifold and the cylinder head.

The two inner plates are arranged between the first and second outer plates so that the top portions of the inner plates orient either inwardly to face toward each other or outwardly to face away from each other. Consequently, when a pressure is applied between the first and second outer plates, a plurality of corrugated beads is formed on the beads of the inner plates to effectively seal therebetween.

The first and second outer plates are softer than the inner plates to thereby prevent damage of the beads of the inner plates when an extreme high pressure is applied to the beads. Preferably, the first outer plate is made of a metal plate having high heat resistance and low heat conductivity, and the second outer plate is made of a metal plate having an outer surface with anti-rust property.

When the manifold gaskets to be placed around the respective exhaust holes of the engine are assembled together for constituting one manifold gasket assembly, the second outer plates of the respective manifold gaskets are connected together by means of connecting members. The connecting members are integrally formed with the second outer plates for connecting the two adjacent manifold gaskets. Each connecting member is provided with a buffer member so that when the engine is operated, the gaskets can be securely situated in position relative to one another without being affected by expansion of engine parts by heat.

BRIEF DESCRIPTION OF THE DRAWINGS

FIGS. 4A and 4B are enlarged section views showing parts of the gasket as shown in FIG. 4;

FIG. 9 is a plan view of the gasket assembly;

FIG. 10 is an enlarged perspective section view along lines 10—10 in FIG. 9; and FIG. 11 is an enlarged perspective section view similar to FIG. 10 for showing a different gasket assembly.

DETAILED DESCRIPTION OF PREFERRED EMBODIMENTS

Figure 1:
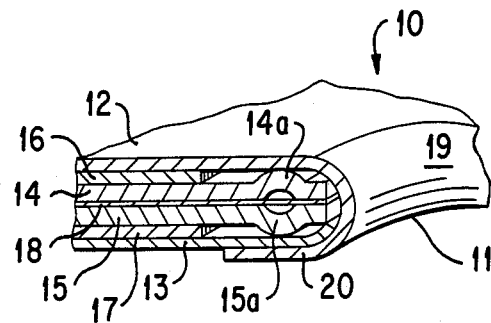
FIGS. 1-3 are perspective views partly in section showing steel laminate gaskets to be used as a cylinder head gasket of a diesel engine.
Figure 2:
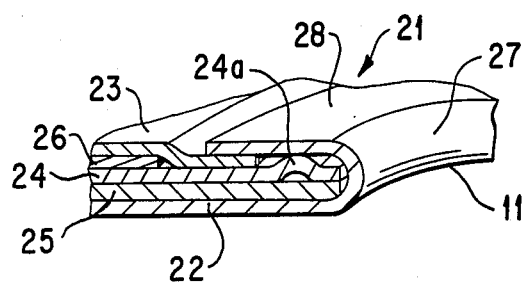
Figure 3:
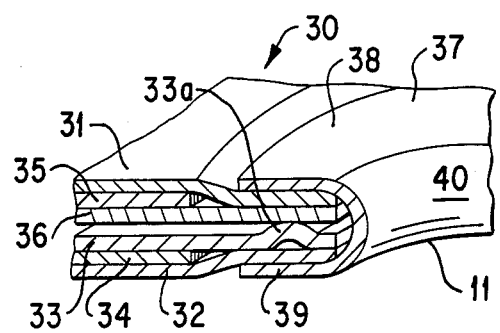
Figure 4:
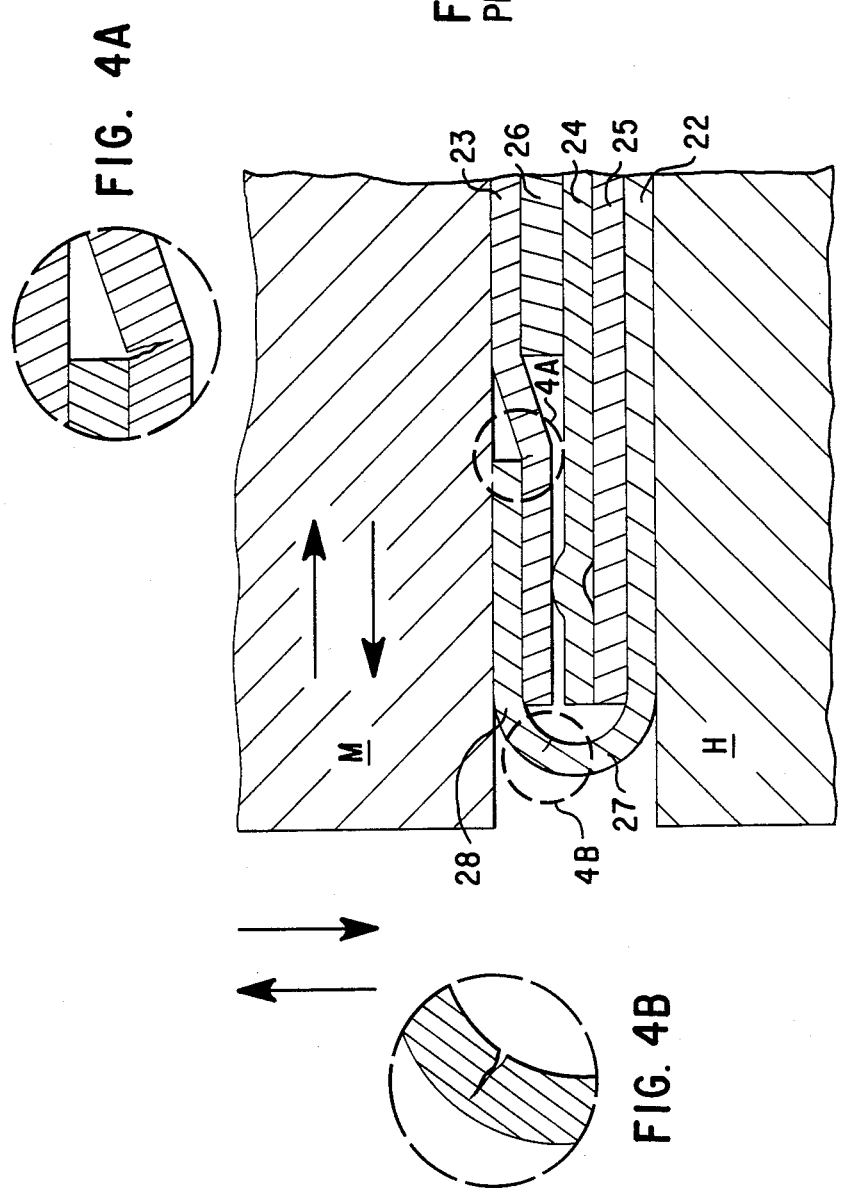
FIG. 4 is a section view showing that the gasket shown in FIG. 2 is used as a manifold gasket.
Figure 5:
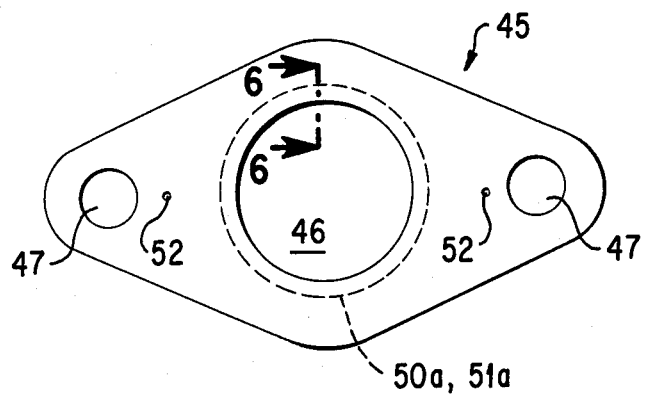
FIG. 5 is a plan view of the manifold gasket in accordance with the present invention.
Figure 6:
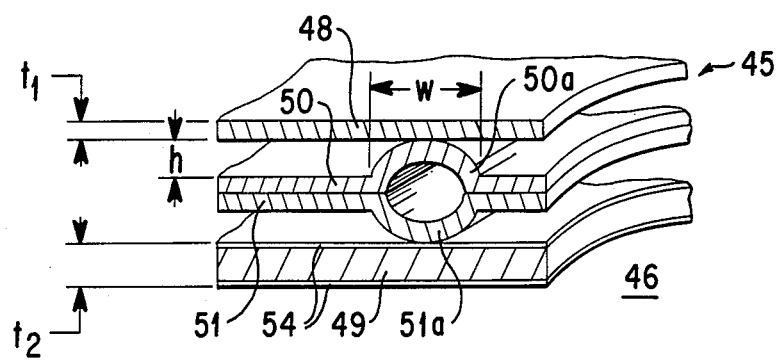
FIG. 6 is an enlarged perspective section view along lines 6—6 in FIG. 5.

Referring to FIGS. 5-6, one embodiment of a manifold gasket 45 to be placed between a manifold M and a cylinder head H of an internal combustion engine is shown. The manifold gasket 45 is provided with a central hole 46 and two side holes 47 to seal one exhaust hole of the cylinder head H of the engine relative to the manifold M. The manifold gasket 45 is situated above the cylinder head H so that the central hole 46 communicates with an exhaust hole of the cylinder head H. Bolts (not shown) passing through the manifold M extend through the side holes 47 and are connected to the cylinder head H. When the bolts are tightened, the manifold M is securely fixed to the cylinder head H, whereby the manifold gasket 45 is firmly held to seal therebetween.

The manifold gasket 45 comprises outer plates 48, 49 and two inner plates 50, 51 situated between the outer plates 48, 49. The inner plate 50 is provided with a bead 50a projecting toward the outer plate 48 and extending around the central hole 46, while the inner plate 51 is provided with a bead 51a projecting toward the outer plate 49 and extending around the central hole 46. The outer plates 48, 49 and the inner plates 50, 51 are connected together by means of spot welding 52 (FIG. 5).

Figure 7:
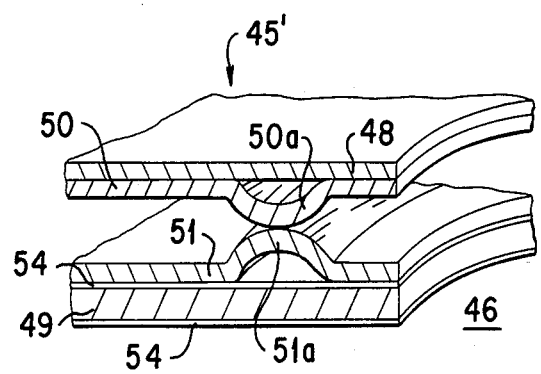
FIG. 7 is an enlarged perspective section view of a different embodiment of the manifold gasket of the present invention.

In the embodiment 45 as shown in FIG. 6, the inner plates 50, 51 are arranged so that the top portions of the beads 50a, 51a contact the outer plates 48, 49 respectively. However, the inner plates 50, 51 may be arranged so that the top portions of the beads 50a, 51a contact with each other, as shown in the embodiment 45' of FIG. 7. The manifold gasket as shown in FIG. 7 operates substantially the same as in FIG. 6.

The manifold gasket 45 of the present invention provides three major mechanisms, namely, a spring mechanism for absorbing deformation of gasket attaching portions of the manifold by heat of the engine, a protection mechanism for protecting the spring mechanism and providing good sealing ability, and a sliding mechanism between the inner plates and the outer plates for relieving fatigue of the gasket due to high temperature and pressure applied thereto.

Figure 8:
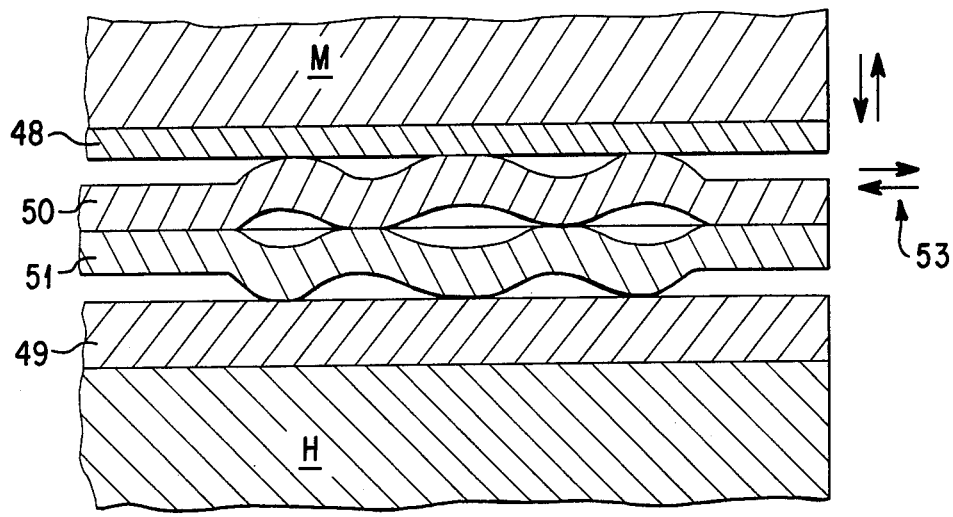
FIG. 8 is an explanatory section view showing the manifold gasket in use.

The spring mechanism of the manifold gasket 45 is obtained by the beads 50a, 51a surrounding the central hole 46. The inner plates 50, 51, therefore, must be formed of steel plates having sufficient spring action. When the manifold M is tightened against the cylinder head H, the beads 50a, 51a as shown in FIG. 6 deform and constitute a plurality of corrugated beads facing each other as shown in FIG. 8. The corrugated beads exert a large amount of sealing pressure at apexes thereof. Namely, the beads 50a, 51a, each having one sealing point at the top portion thereof when the gasket 45 is not tightened, form a plurality of sealing points and exert high sealing pressure when the gasket 45 is actually tightened.

Since the beads 50a, 51a form a plurality of corrugated beads respectively when the gasket 45 is tightened, the two beads 50a, 51a create enough spring ability when comparing a single bead as employed in a cylinder head gasket explained before. Accordingly, even if the gasket attaching portions of the manifold are deformed by heat, the corrugated beads compensate the deformation of the gasket attaching portions to completely seal between the manifold and the cylinder head. These corrugated beads on the inner plates 50, 51, when the engine is operated, cooperate with each other according to deformation or movement of the gasket attaching portions and absorb expansion or contraction of the gasket attaching portion.

The inner plates 50, 51 are, preferably, made of the same material. In case the inner plates 50, 51 are made of a different material, or in case thickness or hardness of the inner plates 50, 51 is different from each other even if the plates 50, 51 are made of the same material, a preferable result can not be obtained, because the same corrugated beads are not formed on the plates 50, 51 due to different patterns of deformation formed on the inner plates 50, 51, when a pressure is applied thereto. Consequently, it is not expected to form a good sealing pressure on the beads 50a, 51a.

The beads 50a, 51a may be formed semicircular or gently protruded outwardly in cross section. Generally, height h of the bead is between 0.3 mm and 0.6 mm, and width w thereof is between 1.5 mm and 4.0 mm. Preferably, the inner plates 50, 51 may be made of a stainless steel plate, for example, JIS (Japanese Industrial Standard) SUS 301, with spring ability.

Thickness of the inner plates 50, 51 is, preferably, between 0.15 mm and 0.20 mm.

It is to be understood that the kind and thickness of the inner plate, height and width of the beads as well as combinations thereof, are determined in view of using conditions of the gasket (e.g., tightening strength, temperature at that place and pressure of the exhaust gas), configuration and structure of the gasket attaching portions of the manifold, easiness of processing of the inner plates, and economy. However, it is required to select proper materials so that when the manifold gasket is tightened at a proper pressure instructed by an engine manufacturer, the beads deform and form a plurality of corrugated beads.

The protection mechanism for protecting the spring mechanism and providing good sealing ability is obtained by the outer plates 48, 49. Namely, the outer plates 48, 49 protect the beads 50a, 51a of the inner plates 50, 51, when the gasket 45 is tightened or variable pressure is applied during operation of an engine, or the gasket attaching portions of the manifold expand or contract due to condition of the engine. Damage of the beads 50a, 51a, i.e., cracks, is prevented by the outer plates 48, 49. For that purpose, the outer plates 48, 49 are preferably, made of a material softer than that of the inner plates 50, 51.

The sliding mechanism between the inner plates and the outer plates, which is one of the major mechanisms of the present invention, means that while the gasket 45 is tightened between the manifold M and cylinder head H, as shown in FIG. 8, if lateral pressure differences occur between the outer plates and inner plates, the inner plates 50, 51 can be moved relative to the outer plates 48, 49 as shown by arrows 53. For this purpose, the gasket 45 is connected together by means of the spot welding 52 so that the inner plates 50, 51 slide relative to the outer plates 48, 49. Consequently, stress applied to the gasket due to expansion and contraction of the gasket attaching portions of the manifold can be absorbed by sliding the inner plates relative to the outer plates. Therefore, the sealing portions of the gasket 45 move according to the condition of the gasket attaching portions to thereby keep the good sealing condition at any time. The corrugated beads are not broken and maintain the good sealing ability.

In order to provide the desired protection mechanism and sliding mechanism, the outer plate 48 at the manifold side exposed to temperature higher than the cylinder head side must be made of a material having a good heat resistance and low heat conductivity. Preferably, the outer plate 48 is made of a stainless steel with a thickness $t_1$ between 0.2 mm and 0.3 mm, and a Micro Vickers Hardness of about 180 Hmv. Since the temperature of the cylinder head H is lower than that of the manifold M when the engine is operated, a mild steel plate may be used as the outer plate 49 at the cylinder head side. Preferably, a thickness $t_2$ of the outer plate 49 is between 0.4 mm and 0.8 mm, and a Micro Vickers Hardness thereof is about 120 Hmv.

The mild steel plate is required to be treated with an anti-rust procedure (i.e., coating 54) to prevent oxidization thereof at high temperature. Since the anti-rust property on the plate is required to be strong against heat, the mild steel plate must be plated (such as with aluminum, zinc and the like), chemically coated (such as chromate coating), or painted with anti-heat paint (such as a material basically containing fluorine resin or silicone resin). When the mild steel plate is used as the outer plate 49 and the stainless steel is used as the outer plate 48, the mild steel plate must be thicker than the stainless steel to minimize deformation of the mild steel plate due to differences of expansion rate between the mild steel plate and the stainless steel.

The manifold gasket 45 can be connected together to form an assembly 55 including a plurality of manifold gaskets 45, as shown in FIG. 9. The assembly 55 can be easily installed on the engine, so that the manifold gaskets 45 are securely fixed in position after installation of the assembly 55.

The manifold gasket 45 used in the assembly 55 is the same as the manifold gasket as explained before. However, the outer plate 49 is integrally connected to the adjacent outer plate 49 at a connecting portion 56, respectively. The connecting portion 56 includes a buffer member 57, which operates to compensate expansion of a distance between the two adjacent gaskets 45 when the engine is operated. Namely, when the engine is operated, the cylinder head H slightly expands due to heat of the engine. In this situation, the gaskets 45 are pulled with each other. Since the buffer member 57 is curved, the buffer member 57 slightly deforms to allow the assembly 55 to follow expansion of the cylinder head H between the gaskets 45. If there is no buffer member 57, the gaskets 45 are pulled with each other so that proper resealing can not be performed.

FIG. 11 shows a part of a gasket assembly 60 similar to the gasket assembly 55 in FIGS. 9 and 10. In the gasket assembly 60, the outer plate 49 is connected to the adjacent outer plate 49 by means of the connecting portion 56, which includes a buffer member 61 instead of the buffer member 57 in FIGS. 9 and 10. The buffer member 61 is formed of a plurality of corrugated beads 62, height of which is shorter than that of the buffer member 57. The buffer member 61 operates the same as in the buffer member 57.

In the gasket assembly 55, since the buffer member 57 is curved with a large radius, the buffer member may touch the engine parts, so that the gasket assembly 55 can not be properly installed between the engine body and the manifold. However, in the same situation, since the height of the buffer member 61 is made short, the gasket assembly 60 can be properly installed. This embodiment is especially useful when there is a small space between the engine body and the manifold.

In a preferred embodiment, the manifold gaskets 45 are integrally connected together to form the assembly 55, as shown in FIGS. 9 and 10. A stainless steel plate with a thickness of 0.3 mm (JIS SUS 304) is used as the outer plate 48 abutting against the manifold M, while a mild steel plate with thickness of 0.6 mm, to which aluminum plating is applied, is used as the outer plate 49. Spring steel plates with thickness of 0.15 mm (JIS SUS 301) are used as the inner plates 50, 51, respectively. The inner plates 50, 51 are arranged so that the top portion of the beads 50a, 51a face outwardly with each other. The outer plates 48, 49 and inner plates 50, 51 are connected together by spot welding 52. The gasket assembly 55 is installed in a gasoline engine with a volume of two liters, which is provided with an aluminum cylinder head and a light weight manifold, wherein an endurance test is performed under severe conditions. The gasket assembly 55 shows good sealing ability.

While the invention has been explained with reference to the specific embodiments of the invention, the explanation is illustrative and the invention is limited only by the appended claims.

What is claimed is:

1. A manifold gasket for an internal combustion engine adapted to be placed between a manifold and a cylinder head to surround an exhaust hole for an exhaust fluid passage, comprising:

a first outer plate having a first hole corresponding to the exhaust hole, said first outer plate abutting against the manifold and being made of a stainless steel plate having high heat resistance and low heat conductivity against exhaust gas and Micro Vickers Hardness of about 180 Hmv, a second outer plate having a second hole corresponding to the exhaust hole, said second outer plate abutting against the cylinder head and being made of a mild metal plate having an outer surface with anti-rust property and Micro Vickers Hardness of about 120 Hmv, said second outer plate being thicker than the first outer plate, and at least two inner plates situated between the first and second outer plates, each inner plate having a third hole corresponding to the exhaust hole and a bead adjacent the third hole to surround the third hole, said bead extending substantially perpendicularly to the horizontal plane of the inner plate and having a top portion, said first and second outer plates and inner plates being arranged and connected together so that portions of the inner plates slide relative to the first and second outer plates due to expansion and contraction properties of the plates as they are effected by the temperature and pressure they are under and the beads of the two inner plates absorb pressure applied perpendicularly to the inner plates and seal between the manifold and the cylinder head, said first and second outer plates being softer than the inner plates to thereby prevent damage of the beads of the inner plates when an extreme high pressure is applied to the beads.

2. A manifold gasket according to claim 1, in which said first and second outer plates and the inner plates are connected by spot welding at portions away from the exhaust hole so that the plates slide with each other.

3. A manifold gasket according to claim 2, in which said two inner plates are arranged between the first and second outer plates so that the top portions of the inner plates orient inwardly to face toward each other to provide a plurality of corrugated beads at the beads when a pressure is applied between the first and second outer plates.

4. A manifold gasket according to claim 2, in which said two inner plates are arranged between the first and second outer plates so that the top portions of the inner plates orient outwardly to face away from each other to provide a plurality of corrugated beads at the beads when a pressure is applied between the first and second outer plates.

5. A manifold gasket assembly for an internal combustion engine adapted to be placed between a manifold and a cylinder head to surround exhaust holes for exhaust fluid passages, comprising:

a plurality of gasket structures connected to each other, each gasket structure including:

a first outer plate having a first hole corresponding to the exhaust hole, said first outer plate abutting against the manifold and being made of a metal plate having high heat resistance and low heat conductivity against exhaust gas, a second outer plate having a second hole corresponding to the exhaust hole, said second outer plate abutting against the cylinder head and being made of a mild metal plate having an outer surface with anti-rust property, said second outer plate being thicker than the first outer plate, and at least two inner plates situated between the first and second outer plates, each inner plate having a third hole corresponding to the exhaust hole and a bead adjacent the third hole to surround the third hole, said bead extending substantially perpendicularly to the horizontal plane of the inner plate and having a top portion, said first and second outer plates and inner plates being arranged and connected together so that portions of the inner plates slide relative to the first and second outer plates due to expansion and contraction properties of the plates as they are effected by the temperature and pressure they are under and the beads of the two inner plates absorb pressure applied perpendicularly to the inner plates and seal between the manifold and the cylinder head, said first and second outer plates being softer than the inner plates to thereby prevent damage of the beads of the inner plates when an extreme high pressure is applied to the beads, and at least one connecting member integrally formed with the second outer plate for connecting the adjacent gasket structures, said connecting member having a buffer member so that when the engine having the gasket assembly therein is operated, the gasket structures can be securely situated in position with each other without being affected by expansion of engine parts by heat.

6. A manifold gasket assembly according to claim 5, in which said first outer plate is a stainless steel plate having Micro Vickers Hardness of about 180 Hmv, and the second outer plate is a mild metal plate having Micro Vickers Hardness of about 120 Hmv.

7. A manifold gasket assembly according to claim 6, in which said first and second outer plates and the inner plates are connected by spot welding at portions away from the exhaust hole so that the plates slide with each other.

8. A manifold gasket assembly according to claim 7, in which said two inner plates are arranged between the first and second outer plates so that the top portions of the inner plates orient inwardly to face toward each other to provide a plurality of corrguated beads at the beads when a pressure is applied between the first and second outer plates.

9. A manifold gasket assembly according to claim 7, in which said two inner plates are arranged between the first and second outer plates so that the top portions of the inner plates orient outwardly to face away from each other to provide a plurality of corrugated beads at the beads when a pressure is applied between the first and second outer plates.

* * * * *

UNITED STATES PATENT AND TRADEMARK OFFICE
CERTIFICATE OF CORRECTION

PATENT NO. : 4,728,110
DATED : March 1, 1988
INVENTOR(S) : Hidetaka Nakasone

It is certified that error appears in the above-identified patent and that said Letters Patent are hereby corrected as shown below:

In a Foreign Application Priority Data of a cover page, change "61-00287[U]" to --61-2871[U]--.

Signed and Sealed this

Twenty-second Day of November, 1988

Attest:

DONALD J. QUIGG

*Attesting Officer*   *Commissioner of Patents and Trademarks*